(12) United States Patent
Takeuchi et al.

(10) Patent No.: US 8,954,232 B2
(45) Date of Patent: Feb. 10, 2015

(54) VEHICLE CONTROL SYSTEM

(75) Inventors: Keisuke Takeuchi, Susono (JP); Youji Kanehara, Nagoya (JP); Toshio Tanahashi, Susono (JP); Yoshimitsu Agata, Susono (JP); Tomohide Kawasaki, Mishima (JP); Ken Koibuchi, Hadano (JP); Kaiji Itabashi, Gotenba (JP); Shin Noumura, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/818,723

(22) PCT Filed: Aug. 29, 2011

(86) PCT No.: PCT/IB2011/001965
§ 371 (c)(1),
(2), (4) Date: Feb. 25, 2013

(87) PCT Pub. No.: WO2012/028923
PCT Pub. Date: Mar. 8, 2012

(65) Prior Publication Data
US 2013/0151074 A1 Jun. 13, 2013

(30) Foreign Application Priority Data
Aug. 30, 2010 (JP) .................................. 2010-192525

(51) Int. Cl.
*B60W 10/04* (2006.01)
*B60W 30/18* (2012.01)
(Continued)

(52) U.S. Cl.
CPC ............... *B60W 10/04* (2013.01); *B60W 10/06* (2013.01); *B60W 10/11* (2013.01); *B60W 10/20* (2013.01);
(Continued)

(58) Field of Classification Search
CPC .. B60G 2800/91; B60G 17/18; B60G 17/165; B60W 10/04; B60W 10/06; B60W 10/11; B60W 10/20; B60W 10/22; B60W 2600/00; B60W 50/82; B60W 50/85; B60W 2540/30; B60W 2520/105; B60W 2520/141; B60W 2550/14; B60W 30/18; B60W 50/06; B60W 2510/604; B60W 2520/125; B60W 2520/28; B60W 2540/10; B60W 2550/502
USPC .......................................... 701/37, 41, 53, 70
See application file for complete search history.

(56) References Cited

U.S. PATENT DOCUMENTS 7,162,346 B2 * 1/2007 Berry et al. ..................... 701/48
7,349,776 B2 * 3/2008 Spillane et al. ................. 701/36
(Continued)

FOREIGN PATENT DOCUMENTS

DE 19 843 395 A1 3/2000
DE 103 60 666 A1 7/2005
(Continued)

OTHER PUBLICATIONS

International Search Report and Written Opinion of the International Searching Authority for PCT/IB2011/001965, mailed on Feb. 22, 2012.

*Primary Examiner* — Calvin Cheung
*Assistant Examiner* — Allen E Quillen
(74) *Attorney, Agent, or Firm* — Kenyon & Kenyon LLP

(57) ABSTRACT

A vehicle control system includes a control portion configured to determine a single parameter based on a running condition of a vehicle, and determine control amounts for a plurality of actuators provided in the vehicle based on the parameter. A relation of the control amount for each of the plurality of actuators to the parameter is predetermined. The control portion is configured to, when the parameter is determined, determine the control amounts for the respective actuators based on the parameter, and control the actuators based on the determined control amounts.

9 Claims, 10 Drawing Sheets

(51) Int. Cl.
  *B60W 10/22*    (2006.01)
  *B60W 10/11*    (2012.01)
  *B60W 10/20*    (2006.01)
  *B60W 10/06*    (2006.01)
  *B60W 40/09*    (2012.01)
  *B60W 50/06*    (2006.01)
  *B60W 50/08*    (2012.01)

(52) U.S. Cl.
  CPC ............... *B60W 10/22* (2013.01); *B60W 40/09* (2013.01); *B60W 50/06* (2013.01); *B60W 50/082* (2013.01); *B60W 50/085* (2013.01); *B60W 30/18* (2013.01); *B60W 2510/0604* (2013.01); *B60W 2510/104* (2013.01); *B60W 2520/105* (2013.01); *B60W 2520/125* (2013.01); *B60W 2520/28* (2013.01); *B60W 2540/10* (2013.01); *B60W 2540/30* (2013.01); *B60W 2550/402* (2013.01); *B60W 2600/00* (2013.01)
  USPC .................... 701/37; 701/41; 701/53; 701/70

(56) References Cited

U.S. PATENT DOCUMENTS

| | | | | |
|---|---|---|---|---|
| 7,672,766 | B2* | 3/2010 | Poilbout | 701/38 |
| 8,428,843 | B2* | 4/2013 | Lee et al. | 701/93 |
| 2008/0183353 | A1* | 7/2008 | Post et al. | 701/42 |
| 2009/0099727 | A1* | 4/2009 | Ghoneim | 701/36 |
| 2009/0125199 | A1* | 5/2009 | Kaigawa | 701/54 |
| 2012/0136506 | A1 | 5/2012 | Takeuchi et al. | |

FOREIGN PATENT DOCUMENTS

| | | |
|---|---|---|
| EP | 1 355 209 A1 | 3/2003 |
| JP | 04-002518 A | 1/1992 |
| JP | 06-249007 A | 9/1994 |
| JP | 2007-302055 A | 11/2007 |
| JP | 2008-74229 A | 4/2008 |
| JP | 2008-132876 A | 6/2008 |
| JP | 2009-530166 A | 8/2009 |
| WO | 2011/021090 A2 | 2/2001 |
| WO | 2007/107362 A1 | 9/2007 |
| WO | 2011/021089 A2 | 2/2011 |
| WO | 2011/021634 A1 | 2/2011 |

* cited by examiner

VEHICLE CONTROL SYSTEM

CROSS REFERENCE TO RELATED APPLICATIONS

This is a 371 national phase application of PCT/IB2011/001965 filed 29 Aug. 2011, which claims priority to Japanese Patent Application No. 2010-192525, filed on Aug. 30, 2010, the contents of which are incorporated herein by reference.

BACKGROUND OF THE INVENTION

1. Field of the Invention

The invention relates to a control system that is structured to control a drive power characteristic defined as a relation of an accelerator operation amount to the output of a drive power source, the speed ratio, etc., a suspension characteristic or chassis characteristic defined as the vehicle's cornering (turning) performance responsive to the driver's steering operation, sinking of the outer side wheels at a corner, the degrees of bumps and rebounds, or the ease with which bumps and rebounds occur, etc. (may hereinafter be commonly, or collectively, referred to as "running characteristics"), such that they conform to the driver's preference(s), vehicle travel environment, and so on.

2. Description of Related Art

The manners in which the behavior of a vehicle changes in response to an accelerator operation, a brake operation, a steering wheel operation, etc. depend on the structures of mechanisms related, to such operations, and the data set and used by a control system. In many vehicles, "running characteristics", that is, the manners in which the behavior of the vehicle body changes in response to, for example, the amounts of operations and external forces input from the tires, are set to characteristics that are most likely to be accepted by customers, taking into account the intended uses of the vehicles and prospective and/or target users.

Running characteristics, individually set for each vehicle model, are set so as to meet conditions prescribed based on expectations and assumptions in design. However, in reality, there are various driver's preferences, and the vehicle travels in various travel environments, such as roads in urban and residential areas, expressways, windings, uphill roads, and downhill roads. Thus, in reality, the characteristics required of the vehicle differ from one driver to another, and from one travel environment to another. Various technologies have been developed to minimize the discrepancies or difference between vehicle characteristics and the driver's driving preference(s). One such technology is described in the following patent documents.

The system described in Japanese Patent Application Publication No. 06-249007 (JP-A-06-249007) is structured to factor the driver's driving preference(s) in the behavior control of the vehicle. More specifically, the system described in Japanese Patent Application Publication No. 06-249007 is a drive power control system using a neurocomputer, and it is structured to learn a relation of an acceleration(s) to the accelerator pedal travel and vehicle speed, formulate "required acceleration model" from the learned relation, and then calculate a throttle opening degree based on the difference between the required acceleration model and "second reference acceleration model" reflecting the driver's driving preference(s) and the difference between the second reference acceleration model and "first reference acceleration model" that is a standard reference acceleration model.

Meanwhile, Japanese Patent Application Publication No. 2008-132876 (JP-A-2008-132876) describes a vehicle control system that includes multiple switches used to select the drive mode from among multiple modes. The switches include a "SPORT" mode switch, a "SNOW" mode switch, and an "ECO" mode switch. When the drive mode is selected through switch operation, the vehicle control system outputs control command signals, including the one indicating the selected drive mode, to an engine ECU and a suspension ECU to operate given actuators in accordance with the selected drive mode.

Further, Japanese Patent Application Publication No. 2008-74229 (JP-A-2008-74229) describes a vehicle travel control system structured to allow the driver to select a desired lateral acceleration. According to this publication, the vehicle travel control system may be structured to switch the lateral acceleration from one value to another value depending upon which of "SPORT" mode and "NORMAL" mode of the automatic transmission is presently set, and further the vehicle travel control system may be structured to switch the lateral acceleration from one value to another value depending upon which of "SPORT" mode and "NORMAL" mode of the suspension mechanisms is presently set, and through such switching, the running can be made "mild" or "agile".

Further, Published Japanese Translation of PCT Application No. 2009-530166 (JP-A-2009-530166) describes a system that determines the driver's driving style based on the data indicating accelerations in the vehicle, and then sets the operations of sub-systems according to the determined driving style. According to this publication, the sub-systems include an engine control system, transmission control system, steering control system, brake control system, air-suspension control system, etc.

As mentioned earlier, various technologies have been developed which change or set control amounts, etc. for a throttle valve, a suspension mechanism, a transmission, and so on, in accordance with vehicle accelerations or in response to the driver's switch operation, and control the acceleration performance and suspension performance of the vehicle to conform to the present acceleration/deceleration state and driver's driving preference(s). However, there are various factors that affect the acceleration performance, cornering (turning) performance, ride, etc. of the vehicle. In reality, therefore, with related-art technologies as those described above, although one or more of control characteristics that influence the running characteristics of the vehicle, such as the drive power characteristic and chassis characteristic, can be changed according to accelerations or in response to switch operation, expected or desired running characteristics can not be obtained sufficiently.

SUMMARY OF THE INVENTION

The invention provides a control system that improves driveability by more properly reflecting the driver's driving preference(s) and/or driving operation style in the running characteristics of the vehicle.

A first aspect of the invention relates to a vehicle control system including a control portion configured to determine a single parameter based on a running condition of a vehicle, and determine control amounts for a plurality of actuators provided in the vehicle based on the parameter. A relation of the control amount for each of the plurality of actuators to the parameter is predetermined. The control portion is configured to, when the parameter is determined, determine the control amounts for the respective actuators based on the parameter, and control the actuators based on the determined control amounts.

In the above-described aspect, the parameter may include a parameter determined based on a measured acceleration detected by a sensor provided in the vehicle, or an estimated acceleration calculated from an operation amount of an operating mechanism that causes an acceleration in the vehicle.

In the above-described aspect, the parameter may include a parameter determined based on a synthetic acceleration obtained by synthesizing an acceleration in a longitudinal direction of the vehicle and an acceleration in a lateral direction of the vehicle.

In the above-described aspect, the plurality of actuators may include at least any two of an output control actuator that changes an output from a drive power source of the vehicle, a shift actuator that changes a speed ratio of a transmission provided in the vehicle, an actuator of a steering mechanism provided in the vehicle, a suspension actuator of a suspension mechanism provided in the vehicle, and an effect producing actuator provided in the vehicle.

In the above-described aspect, an operation characteristic of each of the plurality of actuators may be determined predetermined, the operation characteristic being a relation of an operating amount to a command signal; and the control amount may include a control amount that changes the operation characteristic.

In the above-described aspect, the control amount for each of the plurality of actuators may change at least one of a timing at which the actuator is operated, and an operating amount of the actuator.

The vehicle control system according to the above-described aspect may further include an adjustment mechanism that is manually operated to change the control amounts determined based on the single parameter.

The vehicle control system according to the above-described aspect may further include a switching portion that switches a running mode of the vehicle among an automatic mode, an economy mode, a sport mode, a snow mode, and a normal mode. The control portion may be configured to determine the single parameter, determine the control amounts for the respective actuators based on the parameter, and control the actuators based on the determined control amounts, when the automatic mode is selected using the switching portion.

The invention is applicable to a vehicle including a plurality of actuators that are operated to control the vehicle behavior and/or the manner in which the vehicle behavior changes. When the control system according to the invention is provided in such a vehicle, a single parameter is determined based on the running condition of the vehicle, and the control amounts for the respective actuators are determined based on the single parameter, whereby the plurality of actuators are integrally controlled based on the running condition of the vehicle. As a result, the respective actuators are integrally operated in accordance with the running condition of the vehicle, and the running characteristics, including the vehicle behavior or the characteristic thereof, conform to the present running condition of the vehicle. Accordingly, in view of the fact that the running condition of a vehicle reflects the driver's driving preference(s) at the present time point, the vehicle provides running characteristics expected or desired by the driver, and thus better driveability.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described. A vehicle, to which a control system according to the embodiment of the invention is applied, has an ordinary configuration, and thus includes a drive power source (e.g., engine, electric motor(s)) and a transmission structured to shift in steps or continuously and connected to the output side of the drive power source. The vehicle travels on the torque transferred from the transmission to the drive wheels and turns as the front wheels are steered via a steering mechanism. Brakes are provided at the respective wheels, and the body of the vehicle is supported by suspension mechanisms. The control system of the embodiment of the invention is structured to change the manner in which to control the drive power using the engine and transmission, the manner in which to control steering using the steering mechanism, the manner in which to control braking using the brakes, and the manner in which to support the vehicle body via the suspension mechanisms, in accordance with the running condition of the vehicle. That is, since the engine, transmission, and the mechanisms described above are used to change the behavior of the vehicle, the control system of the embodiment of the invention is structured to change the running characteristics of the vehicle based on its running condition. Thus, "running characteristics" in the embodiment of the invention encompass the drive power characteristic developed via the drive power source, transmission, and brakes, the steering characteristic, cornering (turning) performance, and/or the steering power assist characteristic developed via the steering mechanism, the suspension characteristic and/or the damper characteristic developed via the suspension mechanisms. In the following, thus, these characteristics will be commonly, or collectively, referred to as "running characteristics".

The control system of the embodiment of the invention determines a value of a given parameter based on the running condition of the vehicle. The running condition of the vehicle depends on longitudinal and lateral accelerations, "synthetic acceleration" obtained by synthesizing the longitudinal and lateral accelerations, accelerator operation amount, brake operation amount, steering wheel operation amount, yawing level, yaw rate, etc. Note that each acceleration includes "measured acceleration" actually measured using a sensor and "estimated acceleration" calculated from the accelerator operation amount or the brake operation amount. In the following example, a parameter of which the value is determined based on accelerations is used.

Figure 2:
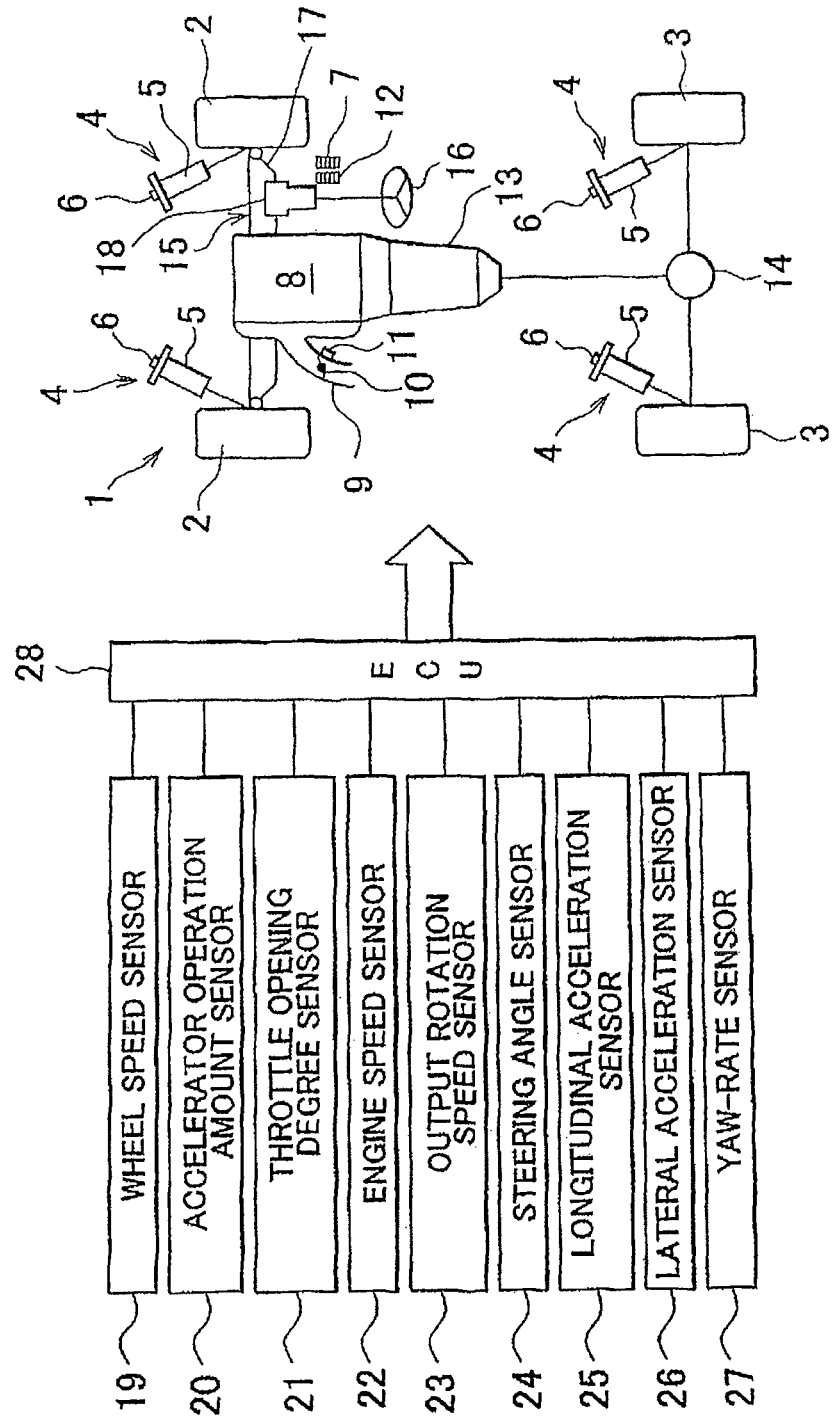
FIG. 2 is a view schematically showing a vehicle to which the invention can be applied.

First, a vehicle to which the embodiment of the invention is applied will be described by way of example. The vehicle accelerates, decelerates, and turns in response to operation inputs from the driver. A typical example of the vehicle is a motor vehicle having, as its drive power source, an internal combustion engine and/or an electric motor(s). FIG. 2 is a block diagram showing an example, that is, a vehicle 1. The vehicle 1 includes four wheels, that is, two front wheels 2 to be steered ("steered wheels") and two rear wheels 3 to be driven ("drive wheels"), which are connected to the vehicle body (not shown in the drawings) via respective suspension mechanisms 4. Each suspension mechanism 4 includes, as its main components, a spring and a shock absorber (damper) 5, which is shown in FIG. 2, as ordinary suspension mechanisms. Referring to FIG. 2, each shock absorber 5 is structured to absorb shocks utilizing the resistance against the flow of fluid (e.g., gas, liquid), and this flow resistance is adjustable through the use of a motor 6, which is an example of "actuator". That is, for example, increasing the flow resistance suppresses sinking of the vehicle body and thus makes the ride "hard", providing a sporty drive feeling in exchange for reduced comfort. Note that each shock absorber 5 may be structured such that the vehicle height can be adjusted by feeding pressurized gas to or discharging it from the shock absorber 5.

Brakes (not shown in the drawings) are provided, respectively at the front wheels 2 and rear wheels 3. As a brake pedal 7, provided in front of the driver's seat, is stepped down, the brakes are operated to apply braking forces to the front wheels 2 and rear wheels 3, respectively.

For example, a drive power source having a known structure, such as an internal combustion engine, an electric motor(s), and a mechanism obtained by combining the internal combustion engine and the electric motor(s), may be used as the drive power source of the vehicle 1. FIG. 2 shows an example vehicle configuration including an internal combustion engine (engine) 8 as the drive power source of the vehicle 1. A throttle valve 10 for controlling the intake amount is provided at an intake pipe 9 of the engine 8. The throttle valve 10 is structured as a so-called "electronic throttle valve", driven to open and close by an electrically controlled actuator 11 (e.g., an electric motor) to adjust the opening degree of the throttle valve 10. The actuator 11 is operated to adjust the opening degree of the throttle valve 10 (throttle opening degree) to a given opening degree in accordance with the travel of an accelerator pedal 12 provided in front of the driver's seat, that is, the accelerator operation amount.

The relation between the accelerator operation amount and the throttle opening degree may be appropriately set. The closer it is to "one-to-one relation", the more "direct" the drive feeling, thus, the more "sporty" the running characteristics of the vehicle 1. Conversely, if this characteristic (relation) is set so as to set the throttle opening degree relatively small with respect to the accelerator operation amount, the running characteristics of the vehicle become "mild". In a case where an electric motor is used as the drive power source, a current controller (e.g., an inverter or a converter) for controlling the motor current in accordance with the accelerator operation amount is provided in place of the throttle valve 10, the current is adjusted in accordance with the accelerator operation amount, and the relation of the current value to the accelerator operation amount, which is one of the running characteristics, is appropriately changed.

A transmission 13 is connected to the output side of the engine 8. The transmission 13 is structured to appropriately change the speed ratio, that is, the ratio between the input and output rotation speeds. The transmission 13 is, for example, a known non-continuous multi-speed automatic transmission, belt-drive continuously variable transmission, or toroidal continuously variable transmission. The transmission 13 includes an actuator (not shown in the drawings) and changes the speed ratio in steps, or continuously, by appropriately controlling the actuator. More specifically, shift control is executed according to a predetermined shift diagram specifying speed ratios to be set in accordance with the vehicle state such as the accelerator operation amount (i.e., the amount of the driver's accelerator operation) and the vehicle speed, or the shift control is executed by calculating a target output based on the vehicle state such as the vehicle speed and the accelerator operation amount, determining a target engine speed based on, for example, the calculated target output and an optimum fuel economy curve, and then controlling the shifting to achieve the target engine speed.

The shift control may be adapted to allow mode selection between a mode for giving a higher priority to fuel economy (i.e., a fuel economy mode) and a mode for increasing drive power (i.e., a greater drive power mode). For example, in the fuel economy mode, the transmission 13 is shifted up at a relatively low vehicle speed, or speed ratios for high-speed drive are used in relatively low vehicle speed ranges. In the greater drive power mode (or an enhanced acceleration characteristic mode), the transmission 13 is shifted up at a relatively high vehicle speed, or speed ratios for low-speed drive are used inn relatively high vehicle speed ranges. Such mode selection, for example, can be accomplished through switching between shift diagrams, correction of a required drive amount, and/or correction of the calculated speed ratio. Meanwhile, if necessary, a power-transfer mechanism, such as a torque converter with a lockup clutch, may be provided between the engine 8 and the transmission 13. The output shaft of the transmission 13 is connected to the rear wheels (drive wheels) 3 via a deferential 14 that is the final reduction gearset.

A steering mechanism 15 for steering the front wheels 2 includes a steering linkage 17 via which the rotation of a steering wheel 16 is transferred to the left and right front wheels 2, and an assist mechanism 18 for assisting the driver's steering operation by adjusting the steering angle and/or steering force. The assist mechanism 18 includes an actuator (not shown in the drawings) and is structured to appropriately adjust the amount of the assisting operation by the actuator.

Meanwhile, although not shown in the drawings, the vehicle 1 includes, as systems for stabilizing the behavior and/or attitude of the vehicle 1, an anti-lock brake system (ABS), a traction control system, a vehicle stability control system (VSC) for integrally controlling the anti-lock brake system and traction control system, and so on. These systems may be known systems. They are adapted to stabilize the behavior of the vehicle by preventing or suppressing locking and slipping of the wheels 2 and 3, by reducing the braking force on one or more of the wheels 2 and 3 or applying barking force to one or more of the wheels 2 and 3 while controlling the engine torque, in accordance with the differences between the vehicle body speed and the respective wheel speeds. Further, the vehicle 1 may include a navigation system that obtains various data on the road that the vehicle 1 is traveling and the road(s) that the vehicle 1 is to travel (i.e., travel environment data), and a switch used to manually select the running mode from among "SPORT" mode, "NORMAL" mode, and "ECO" mode (fuel-economy-oriented mode). Further, the vehicle 1 may include a four-wheel-drive (4WD) mechanism that can be used to change running characteristics, such as the climbing performance, acceleration performance, and cornering (turning) performance.

The vehicle 1 is provided with various sensors for obtaining data used in controlling the engine 8, the transmission 13, the shock absorbers 5 of the respective suspension mechanisms 4, the assist mechanism 18, the systems described above (not shown in the drawings), etc. The sensors include, for example, wheel speed sensors 19 for detecting, respectively, the rotation speeds of the front wheels 2 and rear wheels 3, an accelerator operation amount sensor 20, a throttle opening degree sensor 21, an engine speed sensor 22, an output rotation speed sensor 23 for detecting the speed of output rotation of the transmission 13, a steering angle sensor 24, a longitudinal acceleration sensor 25 for detecting a longitudinal acceleration (Gx), a lateral acceleration sensor 26 for detecting a lateral acceleration (Gy) (i.e., an acceleration in the lateral direction of the vehicle 1), and a yaw rate sensor 27. Note that the acceleration sensors 25 and 26 may be used also as acceleration sensors for vehicle behavior control using the anti-lock brake system (ABS), the vehicle stability control system (VSC), etc. Further, if the vehicle 1 is provided with an air bag(s), the acceleration sensors 25 and 26 may also be used in the control for deployment of the airbag(s). Further, an acceleration sensor may be arranged on a horizontal plane to be inclined by a predetermined angle (e.g., 45 degrees) with respect to the longitudinal direction of the vehicle 1, and the longitudinal acceleration Gx and lateral acceleration Gy may be obtained by resolving the value detected by the acceleration sensor into longitudinal and lateral accelerations. Further, the longitudinal acceleration Gx and lateral acceleration Gy may be calculated based on the accelerator operation amount, vehicle speed, road load, steering angle, etc., instead of being detected via the sensors. The sensors 19 to 27 send their detected signals (data) to an electronic control unit (ECU) 28. The electronic control unit 28 performs various calculations and computations according to programs using the received data and various pre-stored data, and outputs control command signals, as a result of the calculations, to the respective systems and/or the actuators of the systems. An operation characteristic of each of the actuators is predetermined. The operation characteristic is a relation of an operating amount to a command signal. Note that the acceleration that is used is not limited to the synthetic acceleration including acceleration components in a plurality of directions, such as the synthetic acceleration including the acceleration component in the longitudinal direction of the vehicle and the acceleration component in the width direction (lateral direction) of the vehicle. That is, the acceleration in a given single direction (e.g., the longitudinal direction) may be used.

The control system of the embodiment of the invention is structured to factor the driver's driving preference(s) in the vehicle behavior control (i.e., the running characteristic control) based on the running condition of the vehicle. The running condition of the vehicle is the condition represented by the longitudinal acceleration, lateral acceleration, yawing acceleration, rolling acceleration, and/or an acceleration into which the accelerations in the multiple directions are combined. That is, normally, accelerations occur in multiple different directions when a vehicle is controlled to travel at a target speed and/or in a target direction or when a vehicle under influences from the travel environment (e.g., the road surface state) is controlled to return to the original state. Therefore, the running condition of a vehicle reflects, to some extent, the travel environment and driver's driving preference(s). In view of the background discussed above, the control system of the embodiment of the invention is structured to reflect, based on the running condition of the vehicle 1, the driver's driving preference(s) and/or the travel environment in the vehicle running characteristic control.

As mentioned earlier, the vehicle behavior depends on, for example, the acceleration performance, the cornering (turning) performance, the support stiffness at each suspension mechanism 4 (i.e., the degrees of bumps and rebounds and the ease with which they occur), and the degrees of rolling and pitching. The control system of the embodiment of the invention is structured to use the running condition as a factor based on which to control the running characteristics. This control of running characteristics may be implemented using the acceleration in a given direction, the accelerations in given multiple directions, or a synthetic acceleration, which are examples of "the running condition", without acceleration value correction. However, in order to reduce the feeling of discomfort more effectively, an index obtained by correcting the above-mentioned acceleration(s) or the synthetic acceleration may be used for the control of running characteristics.

Hereinafter, "sports index" (SPI) will be described as an example of the index. SPI is an index indicating the driver's intention(s) or the running condition of the vehicle. SPIs applicable to the embodiment of the invention are, for example, indexes obtained by synthesizing accelerations in multiple directions (in particular, their absolute values). An example of such SPIs is a synthetic acceleration obtained by synthesizing the longitudinal acceleration Gx and lateral acceleration Gy, which are the accelerations exerting large influences on the vehicle behavior with respect to the travel direction. For example, "instantaneous SPI Iin" is calculated as $Iin = (Gx^2 + Gy^2)^{1/2}$. The accelerations may either be detected using the sensors, or calculated or estimated based on the operation performed by the driver (e.g., the accelerator operation amount, the steering angle, the depression force on the brake pedal, the travel (operation amount) of the brake pedal). Further, the term "instantaneous SPI Iin" indicates that it is an index calculated based on accelerations in respective directions, which are obtained at each moment during the travel of the vehicle. Thus, the instantaneous SPI Iin is a physical quantity. With regard to the meaning of "each moment", for example, when accelerations are repeatedly detected and the instantaneous SPI Iin is repeatedly calculated based on the detected accelerations in predetermined cycles, i.e., at given time intervals, "each moment" corresponds to each time point at which this process is executed.

Of the longitudinal acceleration Gx used in the above-indicated equation, at least one of the acceleration-side accelerations and deceleration-side acceleration (i.e., deceleration) may be subjected to a normalization operation or a weighting operation. Namely, while the deceleration-side acceleration is larger than the acceleration-side acceleration in general vehicles, the difference is hardly felt or recognized by the driver, and, in many cases, the driver recognizes the acceleration-side and deceleration-side accelerations as being substantially equally applied to the vehicle. The normalization operation is an operation to reduce or eliminate the difference between the actual values and the way the driver feels. For the longitudinal acceleration Gx, the normalization is an operation to increase the acceleration-side acceleration, or reduce the deceleration-side acceleration (i.e., deceleration). More specifically, the ratio of the maximum values of these accelerations is obtained, and the acceleration-side or deceleration-side acceleration is multiplied by the ratio. Also, the weighting operation may be performed to correct the deceleration-side acceleration relative to the lateral acceleration. In sum, the weighting operation is to make a correction by, for example, assigning a weight to at least one of the longitudinal (frontward and backward) accelerations, so that the maximum acceleration in each direction lies on a circle with a given radius, as is the case where the longitudinal drive force and lateral force that can be produced by a tire are represented by a tire friction circle. Through the normalization operation and the weighting operation as described above, the degrees by which the acceleration-side acceleration and deceleration-side acceleration are reflected in the running characteristics become different from each other. A longitudinal acceleration in a decelerating direction and a longitudinal acceleration in an accelerating direction may be subjected to the weighting operation, as one example of the weighting operation, so that the degree of influence of the longitudinal acceleration in the accelerating direction is higher than the degree of influence of the longitudinal acceleration in the decelerating direction. Because the lateral acceleration may appear larger than the acceleration-side acceleration, the lateral acceleration may be also subjected to the normalization operation.

Thus, there is a difference between the actual value of the acceleration and the way in which the driver feels about the acceleration, depending on the direction of the acceleration. For example, such a difference may exist in the acceleration in the yawing direction or rolling direction and the longitudinal direction. According to the embodiment of the invention, therefore, the degrees by which the accelerations in different directions are reflected in the running characteristics may be varied, in other words, the degree of change of the running characteristics based on the acceleration in a certain direction may be made different from the degree of change of the running characteristics based on the acceleration in another direction.

Figure 3:
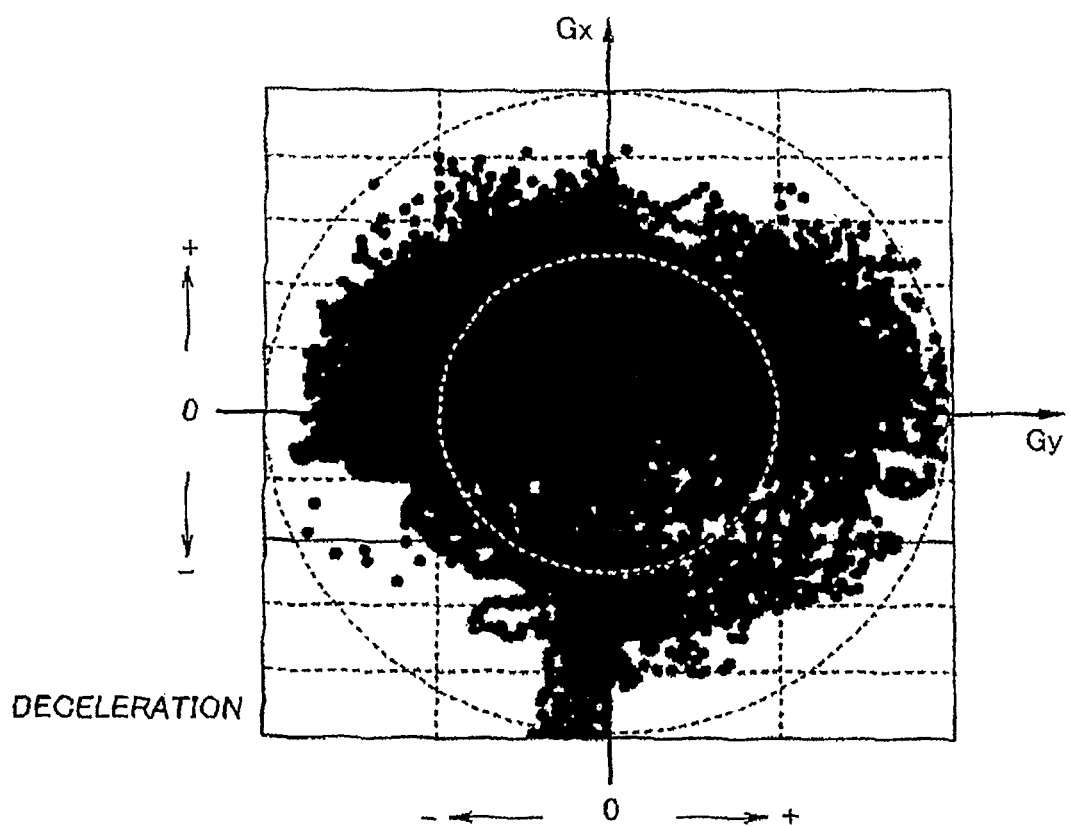
FIG. 3 is a chart in which detected values of longitudinal and lateral accelerations are plotted in a tire friction circle.

FIG. 3 is an example chart in which the sensor values of the lateral acceleration Gy and the values of the longitudinal acceleration Gx as the results of the normalization process and/or weighting process are plotted in a tire friction circle. This is an example where the vehicle runs along a test course modeled after an ordinary road. Referring to FIG. 3, it is found that, as a general tendency, the lateral acceleration Gy also frequently becomes large when the vehicle is decelerated to a large degree, and the longitudinal acceleration Gx and the lateral acceleration Gy occur along the tire friction circle.

Figure 4:
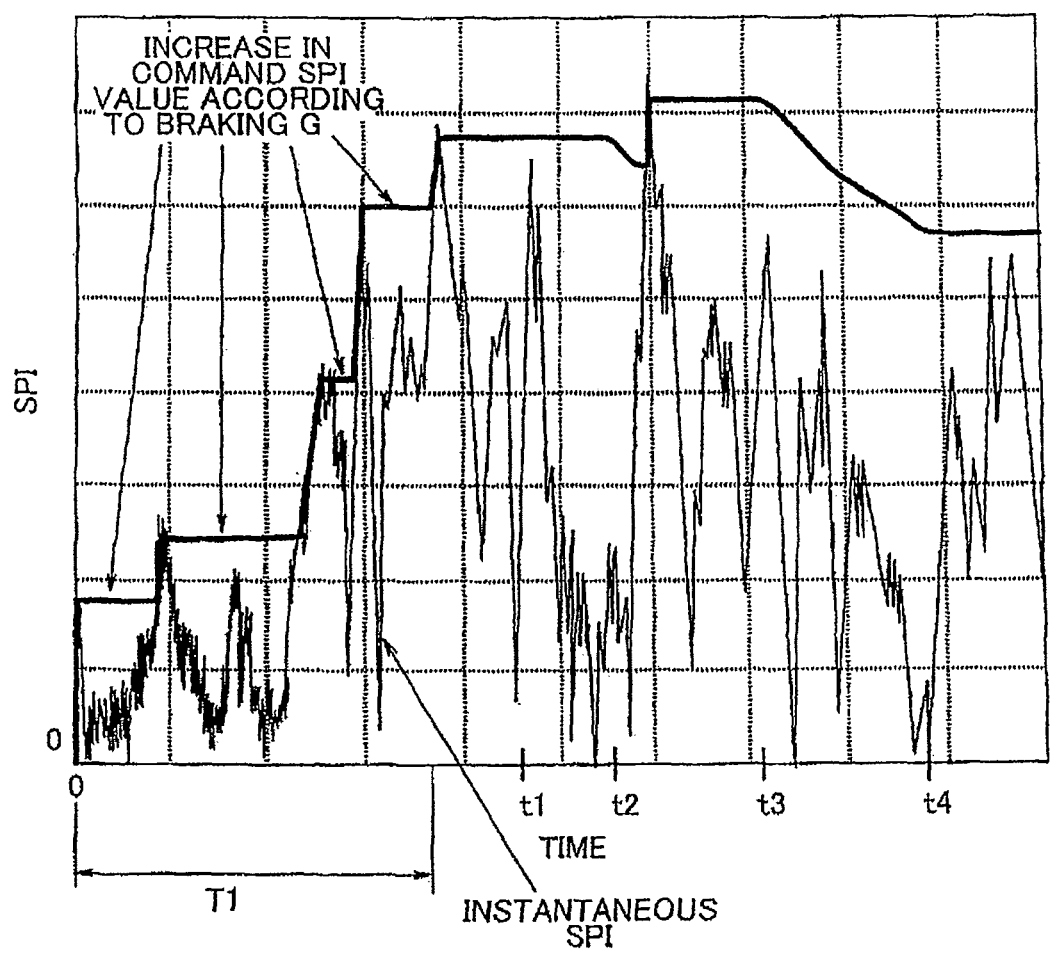
FIG. 4 is a chart illustrating, by way of example, how a command SPI set based on an instantaneous SPI changes.

According to the embodiment of the invention, a command SPI Iout is determined based on the instantaneous SPI Iin. The command SPI Iout is an index used for the control for changing the running characteristics. The command SPI Iout rises immediately in response to an increase in the instantaneous SPI Iin based on which the command SPI Iout is calculated, and lowers after a delay in response to a decrease in the instantaneous SPI Iin. More specifically, the command SPI Iout lowers in response to a decrease in the instantaneous SPI Iin provided that a predetermined condition is satisfied. The chart in FIG. 4 illustrates, by way of example, how the command SPI Iout, set based on changes in the instantaneous SPI Iin, changes. In this example, the instantaneous SPI Iin is indicated using the values plotted in FIG. 3, and the command SPI Iout is set to the local maximum value of the instantaneous SPI Iin and is maintained at the same value until the predetermined condition is satisfied. Thus, the command SPI Iout changes to a larger value immediately and changes to a smaller value relatively slowly.

More specifically, referring to FIG. 4, it may be assumed that the vehicle is turning white being braked in a time zone T1 starting from the beginning of the control. In this situation, the instantaneous SPI Iin, which is determined in accordance with the acceleration changes during the turning, rises and falls repeatedly. In the time zone T1, the instantaneous SPI Iin that exceeds the previous local maximum value occurs before the predetermined condition described above is satisfied, and thus the command SPI Iout rises in a stepwise manner accordingly, and is maintained. On the other hand, at time t2 and time t3, the predetermined condition for allowing lowering of the command SPI Iout is satisfied, and thus, the command SPI Iout lowers. Such a situation may occur, for example, when the vehicle, which has turned and accelerated, starts to run straight and accelerate. In this way, the condition for allowing lowering of the command SPI Iout is satisfied when it is considered that keeping the command SPI Iout at the previous large value does not conform to a driver's intention. In the embodiment of the invention, the condition is satisfied on the basis of a lapse of time.

More specifically, it can be considered that keeping the command SPI Iout at the previous large value does not conform to the driver's intention(s) when a situation has been continuing where the difference between the command SPI Iout kept at the previous large value and the value of the instantaneous SPI Iin obtained at each moment is relatively large. Therefore, the predetermined condition for allowing lowering of the command SPI Iout is defined such that the command SPI Iout is not allowed to lower in response to the instantaneous SPI Iin changing as a result of the driver temporarily releasing the accelerator pedal 12, for example, when turning acceleration control is executed, and such that the command SPI Iout is allowed to lower when the instantaneous SPI Iin has changed in response to the driver continuously releasing the accelerator pedal 12 in order, for example, to decelerate the vehicle gradually, and the instantaneous SPI Iin has been continuously smaller than the present command SPI Iout for a predetermined period of time. In this way, the predetermined condition for allowing the command SPI Iout to start lowering is defined as the time during which the instantaneous SPI Iin continues to be smaller than the command SPI Iout. For example, in order to factor the actual running condition into the command SPI Iout more accurately, the predetermined condition may be defined to allow the command SPI Iout to start lowering when a time-integral value (or a cumulative value) of the difference between the present command SPI Iout and the instantaneous SPI Iin reaches a predetermined threshold. In this case, for example, the threshold can be set to a desired value based on the results of test drives or drive simulations conforming to the intentions of drivers and/or the results of questionnaires on actual drives on roads. When the time-integral value stated above is used, the difference between the command SPI Iout and the instantaneous SPI Iin and time are both taken into account when determining whether to allow lowering of the command SPI Iout, and therefore the actual running condition and/or vehicle behavior can be more accurately factored into the control for changing the running characteristics.

Meanwhile, in the example illustrated in FIG. 4, the length of the time period for which the command SPI Iout is kept unchanged until time t2 is longer than the length of the time period for which it is kept unchanged until time t3. This is because the following control is executed. That is, at the end of the aforementioned time zone T1, the command SPI Iout is increased to a given value and then maintained onward. Subsequently, the instantaneous SPI Iin increases at time t1, at which the predetermined condition described above has not yet been satisfied, so that the integral value of the difference from the command SPI Iout at that time becomes equal to or smaller than a predetermined value. This predetermined value may be set to a desired value in consideration of the results of test drives and/or drive simulations conforming to the intentions of drivers or errors in calculation of the instantaneous SPI Iin. When the instantaneous SPI Iin is close to the maintained command SPI Iout, the vehicle is presently in the running condition coinciding with or close to the acceleration/deceleration condition and/or the turning condition that causes the instantaneous SPI Iin based on which the maintained command SPI Iout is determined. That is, although a certain period of time has elapsed from when the command SPI Iout is increased to the maintained value, since the running condition at that time is close to the running condition before the elapse of the same period of time, the satisfaction of the predetermined condition for allowing lowering of the command SPI Iout is retarded and the command SPI Iout is kept at the latest value, despite the fact that the instantaneous SPI Iin has been smaller than the same latest value of the command SPI Iout. With regard to the control or process for implementing the retardation mentioned above, an example option is to reset the accumulative value (cumulated value) of the aforementioned period of time or the integral value of the difference between the instantaneous SPI Iin and the command SPI Iout and then restart the time accumulation or the difference integration, and another example option is to subtract a predetermined value from the accumulative value or integral value, and still another example option is to suspend the accumulation or integration for given period of time.

Figure 5:
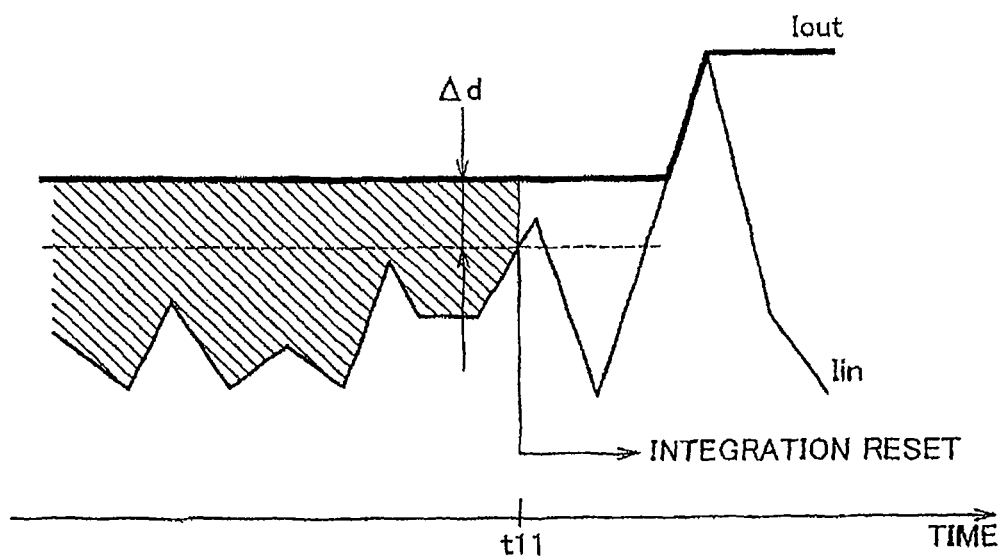
FIG. 5 is a chart illustrating, by way of example, how a time integral value of the difference between the instantaneous SPI and the command SPI changes and is reset.

The chart in FIG. 5 schematically illustrates, by way of example, the difference integration and how it is reset. Note that the area of the hatched region corresponds to the integral value of the difference between the instantaneous SPI Iin and the command SPI Iout. In this example, referring to FIG. 5, the integral value is reset at time t11 at which the difference between the instantaneous SPI Iin and the command SPI Iout becomes equal to or smaller than a predetermined value Δd, and then the difference integration is restarted. That is, the integral value is reset based upon whether the difference between the determined instantaneous SPI Iin and the maintained command SPI Iout is equal to or smaller than the threshold. Thus, when the integral value has been reset, the predetermined condition for allowing lowering of the command SPI Iout is not satisfied, and thus the command SPI Iout is kept at the latest value. After the restart of the integration, in response to the instantaneous SPI Iin exceeding the latest maintained command SPI Iout, the command SPI Iout is updated to the large value corresponding to the instantaneous SPI Iin, the updated command SPI Iout is maintained, and the integral value is reset.

Meanwhile, the control system of the embodiment of the invention is structured to determine an index on the basis of the acceleration and to set the running characteristic on the basis of the index. The acceleration may be a so-called actual acceleration obtained by a sensor; instead, the acceleration may be an estimated acceleration (or target acceleration) calculated from a required drive amount, a vehicle speed, a braking operation amount, a steering angle, or the like. In addition, both an actual acceleration and a target acceleration may be used. When both an actual acceleration and a target acceleration are used, indices (a first index and a second index) are determined in accordance with the respective accelerations, those indices are compared with each other and then the index having a higher SPI value is employed. For example, a so-called actual instantaneous SPI Iin may be determined on the basis of an actual acceleration and an actual command SPI Iout may be determined on the basis of the actual instantaneous SPI Iin; whereas a so-called target instantaneous SPI Iin may be determined on the basis of a target acceleration and a target command SPI Iout may be determined on the basis of the target instantaneous SPI Iin. Then, the larger one of these actual command SPI Iout and target command SPI Iout may be employed, and the running characteristic may be set on the basis of the employed command SPI Iout.

As described above, the instantaneous SPI Iin is calculated based on the actual acceleration or estimated acceleration, and thus the command SPI Iout, set based on the calculated instantaneous SPI Iin, reflects the travel environment condition including a road gradient, road curvedness, road curvature, and the like, and also reflects the driver's driving preference(s). That is, the acceleration of a vehicle changes depending upon the state of the road on which the vehicle is traveling, and the driver accelerates and decelerates the vehicle in consideration of the travel road state, resulting in further changes in the acceleration. The control system of the embodiment of the invention is structured to control the running characteristics of the vehicle using the command SPI Iout. In the embodiment of the invention, the running characteristics include the acceleration characteristic, steering characteristic, suspension characteristic, sound/noise characteristic, etc. These characteristics are appropriately controlled by changing the control characteristic of the throttle valve 10, the shift characteristic of the transmission 13, the damping characteristic of the shock absorber 5 of each suspension mechanism 4, the steering assist characteristic of the assist mechanism 18, and so on, using the actuators provided, respectively, at the devices. The sound/noise characteristic is changed by a so-called effect producing actuator. Basically, the running characteristics are changed such that as the command SPI Iout increases, the vehicle is able to achieve more "sporty" running.

Figure 1:
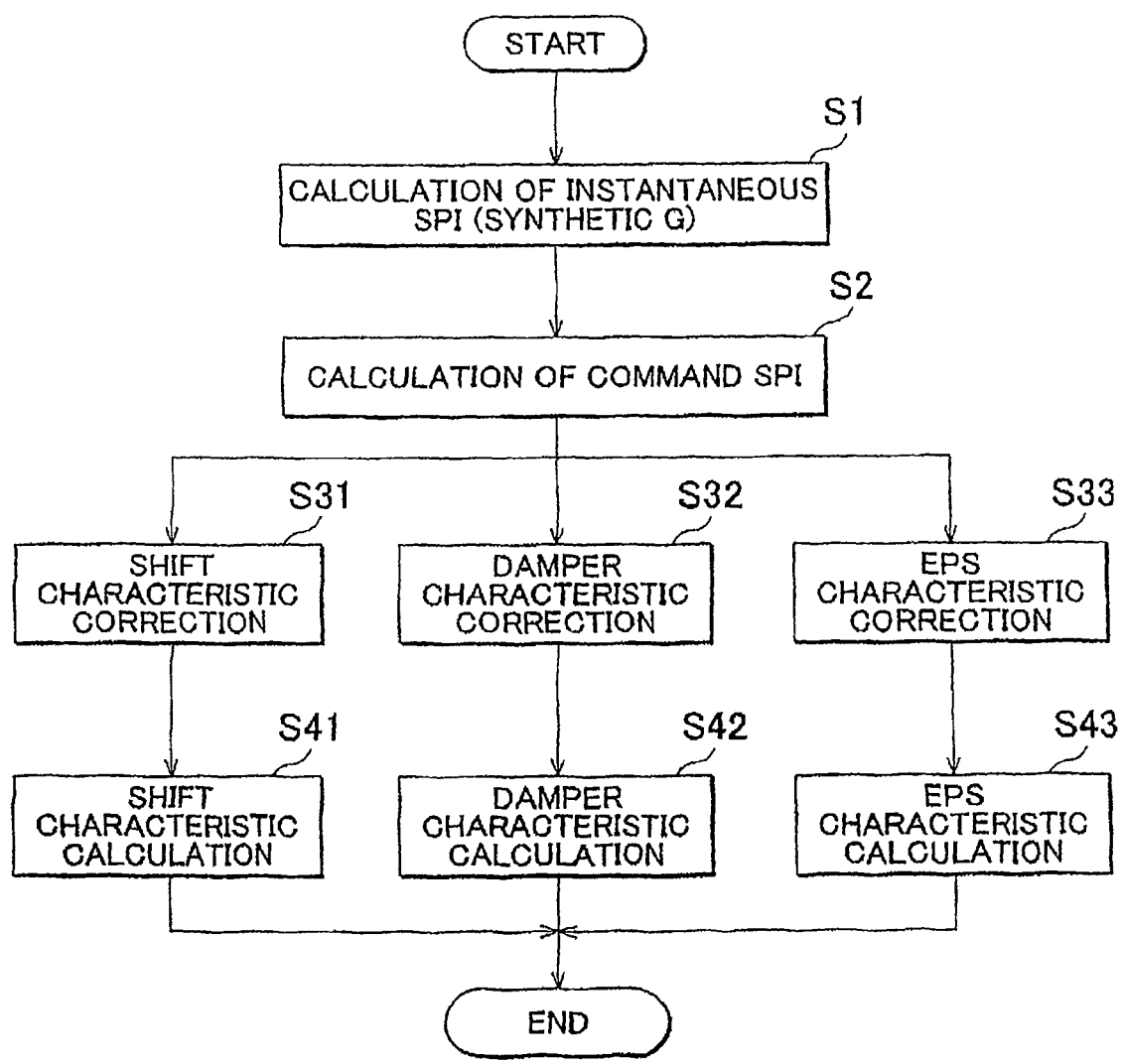
FIG. 1 is a flowchart illustrating an example control procedure executed by a control system according to the invention.

In particular, the control system of the embodiment of the invention is structured to integrally set the controls or control amounts for the above multiple actuators, which are used for changing the running characteristics, in accordance with the single index (parameter) calculated. The flowchart in FIG. 1 is a simplified representation of an example procedure of the control described above. Referring to FIG. 1, first, the value of the index is calculated in accordance with the present running condition (step S1). The index is, for example, the instantaneous SPI Iin (e.g., a synthetic acceleration (SYNTHETIC G)), and the index therefore reflects the driver's driving preference(s), road environment such as road gradient and road curvedness, and so on, at the present time point. Subsequently, the command SPI Iout, which is used as the data based on which to change the running characteristics, is calculated (step S2). Note that the instantaneous SPI Iin and the command SPI Iout are calculated as described earlier.

Next, the running characteristics are set based on the command SPI Iout. Because the command SPI Iout represents the level of demand for sporty running, in order to meet the demand, first, the shift characteristic is corrected (step S31) and the damper characteristic of each suspension mechanism is corrected (step S32), and further the characteristic of the electric power steering mechanism (EPS) is corrected (step S33) if necessary. Example procedures and/or manners of the corrections are as follows. In basic shift control of an automatic transmission, a target speed ratio or a target input rotation speed is determined based on the required drive amount (required acceleration) indicated by, for example, the accelerator operation amount and the vehicle speed at the present time point, and a predetermined actuator(s) is operated so as to achieve the target value. The relation among the required drive amount, the vehicle speed, and the target speed ratio or the target input rotation speed is specified as a basic shift characteristic in vehicle design. The correction in step S31 is the correction of the basic shift characteristic. That is, the shift control manner can be changed by executing numerical processing for changing one of the required chive amount (e.g., accelerator pedal travel), the vehicle speed, and the target speed ratio or the target input rotation speed. For example, if the speed ratio derived from the basic shift characteristic is corrected to be higher or the vehicle speed is corrected to be lower, a relatively high speed ratio (i.e., a speed ratio for low vehicle speed ranges) is used to drive the vehicle, resulting in larger drive power or larger acceleration, thus developing a "sporty" running characteristic. In contrast to this, if the speed ratio derived from the basic shift characteristic is corrected to be lower or the vehicle speed is corrected to be higher, a relatively low speed ratio (i.e., a speed ratio for high vehicle speed ranges) is used to drive the vehicle, resulting in smaller drive power or smaller acceleration, thus developing a "mild" running characteristic.

Figure 6:
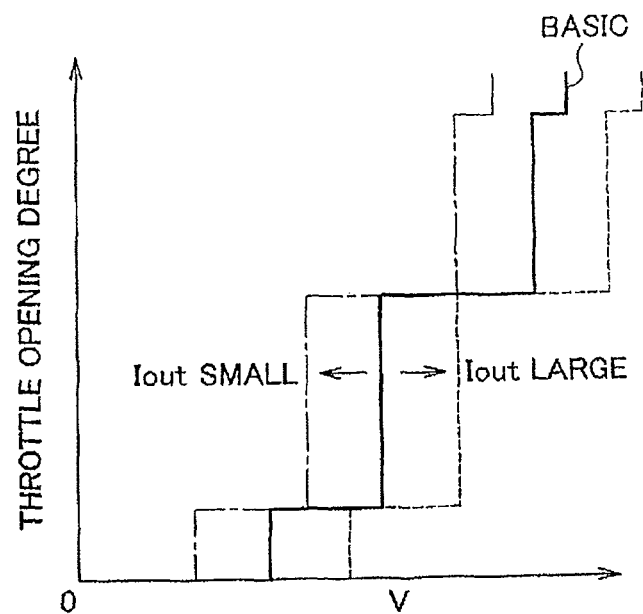
FIG. 6 is a chart showing, as an example shift characteristic correction, how an upshift line is corrected toward the high vehicle speed side and toward the low vehicle speed side in a shift diagram.

After the correction manner and/or the correction amount for the shift characteristic is/are determined, the shift characteristic is calculated (step S41). For example, when the shift characteristic of the automatic transmission is corrected, a shift line is changed. FIG. 6 schematically shows a change in an upshift line when the correction is performed for the non-continuous transmission. The solid line indicates the upshift line derived from the basic shift characteristic. When the command SPI Iout is large, the upshift line is moved toward the right side in FIG. 6. In contrast, when the command SPI Iout is small, the upshift line is moved toward the left side in FIG. 6. Note that when the shift characteristic of the non-continuous transmission is corrected, the shift line that is changed is not limited to the upshift line, that is, a downshift line may be changed in a manner similar to the manner in which the upshift line is changed. Namely, when the command SPI Iout is large, the shift characteristic is corrected so that a relatively large speed ratio is used.

Figure 7:
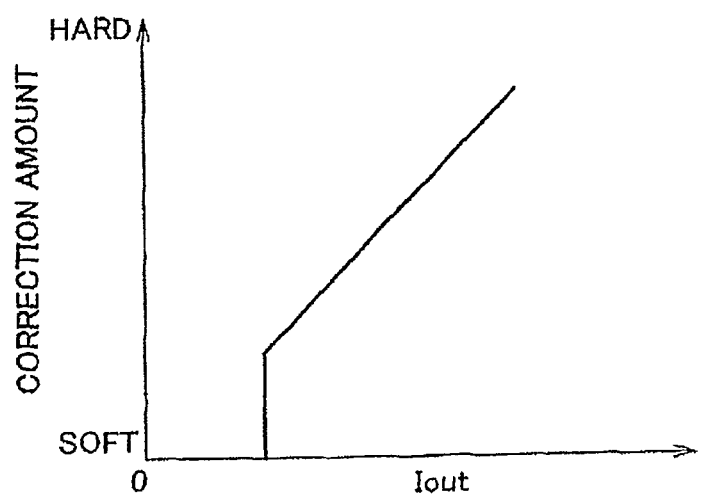
FIG. 7 is a chart illustrating, by way of example, how a damper characteristic correction amount is set.

On the other hand, dampers are devices provided at the respective suspension mechanisms to absorb shocks. For example, dampers are known which are structured to absorb shocks utilizing the flow resistance corresponding to the viscosity of fluid (oil) enclosed in the cylinder of each damper. Among such dampers, some are structured to allow the damper characteristic to be changed by changing the sectional area of the passage through which the fluid flows. That is, narrowing down the flow passage makes the damper characteristic "hard", while widening the flow passage makes the damper characteristic "soft". Presently, dampers structured such that a damper characteristic is changed continuously or in about 10 levels are known. The damper characteristic is predetermined in vehicle design, and in step S32, an amount of the correction of the basic damper characteristic is calculated. More specifically, since it is considered that the larger the command SPI Iout, the stronger the demand for "sporty" running, the correction amount is set to make the damper characteristic harder so that the vehicle body is less likely to sink. Conversely, the smaller the command SPI Iout, the stronger the demand for "mild" running that is less subject to impact force, and therefore the correction amount is set to make the damper characteristic softer. Then, the damper characteristic is calculated based on the correction amount thus set (step S42). FIG. 7 schematically shows an example of the relation between the damper characteristic correction amount and the command SPI Iout.

Figure 8:
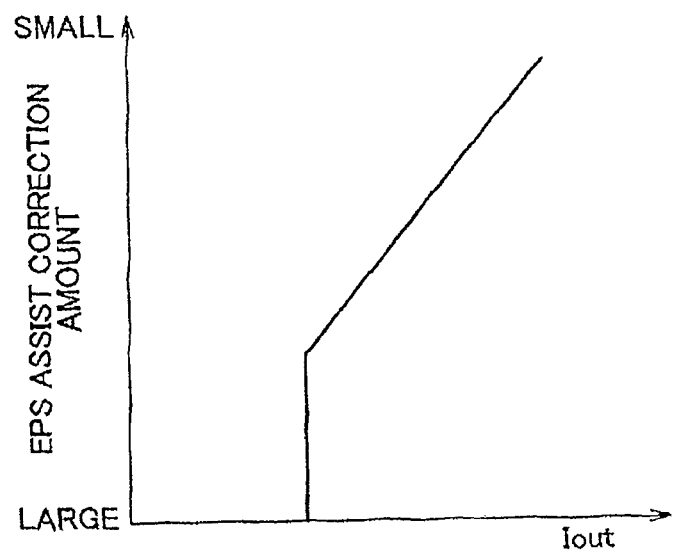
FIG. 8 is a chart illustrating, by way of example, how an EPS characteristic is corrected.

Next, the correction of the EPS characteristic will be described. The electric power steering mechanism (EPS) electrically assists steering operation to realize smooth steering. More specifically, the electric power steering mechanism is structured to assist steering operation in accordance with the vehicle speed, steering operation amount, steering operation rate, etc., so as to make the steering easier. The assist amount and/or the assist manner is/are predetermined for each vehicle model. In Step S33, the amount and/or manner of correction for changing the basic EPS characteristic is/are determined. Subsequently, the EPS characteristic is calculated based on the correction amount and/or the assist manner (step S43). FIG. 8 schematically shows an example of the relation between the EPS characteristic correction amount and the command SPI Iout.

Figure 9:
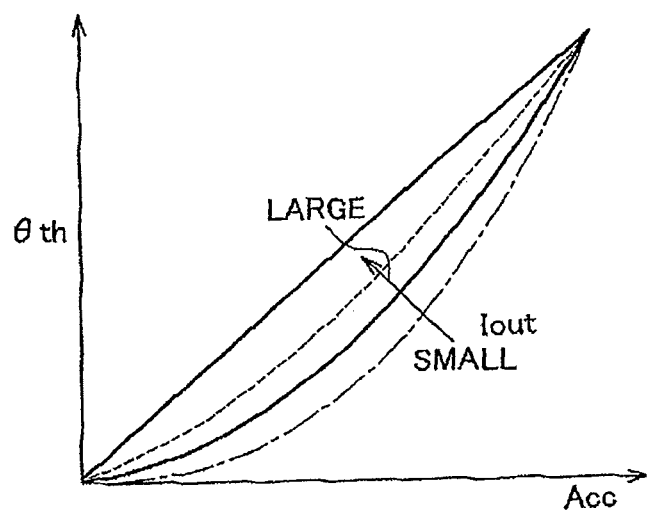
FIG. 9 is a chart illustrating, as an example engine output characteristic correction, how a basic characteristic curve indicating a relation between an accelerator operation amount and a throttle opening degree is corrected.

In the following, for reference, how the output characteristic of the engine 8 is changed will be described by way of example. FIG. 9 is a characteristic curve chart illustrating a relation between an accelerator operation amount Acc and an operating amount θth of the actuator 11 of the throttle valve 10 (i.e., the throttle opening degree), and the solid curve represents the basic engine output characteristic. The straight line inclined by 45 degrees in FIG. 9 represents, for reference, an engine output characteristic corresponding to "one-to-one relation" between the accelerator operation amount Acc and the throttle opening degree θth. On the other hand, the solid curve sagging down represents the basic engine output characteristic. According to the basic engine output characteristic, the throttle opening degree is made relatively small with respect to the accelerator operation amount, and thus, when the accelerator operation amount is small, the engine output toque is relatively small, enabling smooth start or acceleration. This basic engine output characteristic is corrected as follows. When the command SPI Iout is large, that is, when sporty running is required, the values of the throttle opening degree θth with respect to the accelerator operation amount Acc are corrected to be larger, and thus, the engine output characteristic, which is represented by the curve close to the straight line inclined by 45 degrees, is set. Conversely, when the command SPI Iout is small, the values of the throttle opening degree θth with respect to the accelerator operation amount Acc are corrected to be smaller, and thus, the engine output characteristic, which is represented by the curve at the bottom and greatly distant from the inclined straight line, is set.

The corrections of the shift characteristic, damper characteristic, and EPS characteristic, control characteristic for the actuator 11 of the throttle valve 10, and so on, are executed in accordance with the command SPI Iout, i.e., a single index that is set or calculated at the present time point as described above. The amounts and/or manners of the respective corrections may be predetermined based on the results of test drives by standard or typical drivers, drive simulations, and so on. Accordingly, although the corrections of the respective characteristics are based on the single index, i.e., the command SPI Iout, the manners, timings, degrees, etc. of the correction for one characteristic may be different from those of the correction for another characteristic. However, all the corrections are integrally executed in accordance with the single index, i.e., the command SPI Iout. As a result, the shift characteristic, damper characteristic, EPS characteristic, and engine output characteristic are all made conformable to the driver's driving preference(s) and travel environment represented by the single index, i.e., the command SPI Iout at the present time point. Accordingly, the overall vehicle running characteristics match the driver's driving preference(s) and travel environment, resulting an improved driveability. Note that the control amount for each actuator changes at least one of a timing at which the actuator is operated, and an operating amount of the actuator.

Figure 10:
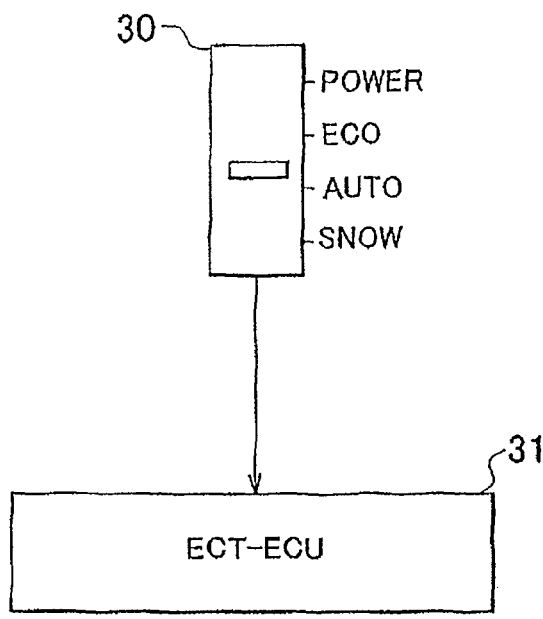
FIG. 10 is a block diagram schematically showing an example system used to switch a running mode.

Meanwhile, as mentioned above, when the running characteristics are corrected using a parameter (index) based on the running condition of the vehicle, the resultant change(s) in the running characteristics causes changes in the shift characteristic, drive torque characteristic, cornering (turning) performance, vehicle body vibration characteristic, and so on. Such behavioral changes automatically occur regardless of the driver's operation. On the other hand, some vehicles have a function of allowing the selection of a running mode through manual switch operation, and a function of allowing the selection of the vibration damping characteristic of the suspension mechanisms and the selection of the vehicle height through manual switch operation. Note that "running mode" refers to the manner in which to set the speed ratio. Acceleration performance and drive power performance vary from one running mode to another. Examples of shift modes are "AUTO (automatic)" or "NORMAL" mode in which a speed ratio is automatically set based on the running condition including the vehicle speed and accelerator operation amount, and in which typical speed ratios are used, "MANUAL" mode in which a speed ratio is selected through manual operation, "ECO (economy)" mode in which a speed ratio for higher fuel economy is automatically and preferentially set, "SNOW" mode in which, at the start of the vehicle, a speed ratio lower than the highest speed ratio is used, and "POWER" or "SPORT" mode in which a speed ratio at each vehicle speed is made higher than in other modes. The block diagram of FIG. 10 shows an example system for such manual selection. In the system shown in FIG. 10, a selection switch 30 for selecting a desired shift mode from among those described above is provided, and the selection switch 30 is electrically connected to a transmission electronic control unit (ECT-ECU) 31. The selection switch 30 inputs a signal indicating the selected shift mode to the transmission electronic control unit 31.

Figure 11:
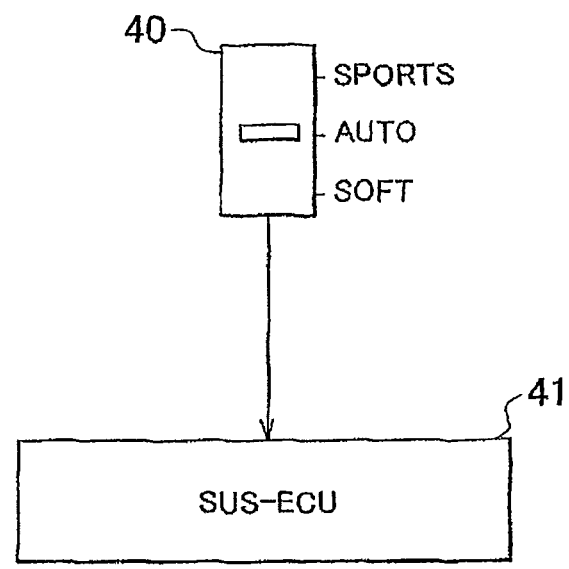
FIG. 11 is a block diagram schematically showing an example system used to switch a suspension mechanism mode.

Further, examples of suspension modes are "AUTO" or "NORMAL" mode in which a normal damping characteristic is used and the vehicle height is set to a normal height and in which the damping characteristic and vehicle height are automatically changed according to the vehicle speed and vibration state, "SPORTS" mode in which a hard damping characteristic for reducing sinking of the vehicle body is used and the vehicle height is reduced, and "SOFT MODE" in which a soft damping characteristic is used and the vehicle height is increased. The block diagram in FIG. 11 shows an example system for such manual selection. In the system shown in FIG. 11, a selection switch 40 for selecting a desired suspension mode from among those described above is provided, and the selection switch 40 is electrically connected to a suspension electronic control unit (SUS-ECU) 41. The selection switch 40 inputs a signal indicating the selected suspension mode to the suspension electronic control unit 41.

Using one or more of the switches described above, the driver can manually select his or her desired mode(s). However, the running characteristics developed in the selected mode(s) may not sufficiently meet the driver's expectation(s) and/or intention(s). In view of this, in a case where the vehicle has a switch(s) for manually selecting one or more characteristics related to the running characteristics, such as the shift characteristic, damper characteristic, and EPS characteristic, the control system of the embodiment of the invention may be structured to change the running characteristics using an index based on the running condition, such as the command SPI Iout, when "AUTO" mode(s) is selected.

Figure 12:
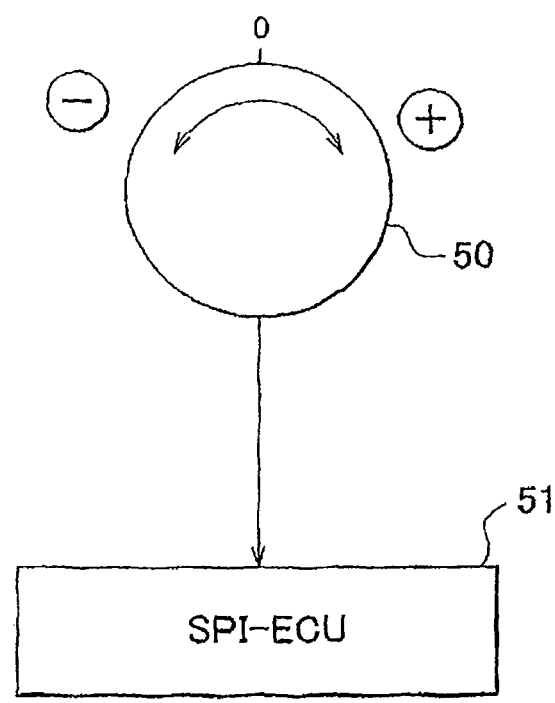
FIG. 12 is a block diagram schematically showing an example system for fine adjustment of a running characteristic correction amount.

Meanwhile, in a case where running characteristics are integrally corrected using a parameter (index) indicative of the running condition or a parameter (index) set based on the running condition, for example, the amounts of corrections of the respective characteristics, such as the shift characteristic and damper characteristic, are predetermined based on the results of tests, simulations, and the like, as mentioned earlier. Thus, the correction amounts or the manners in which to correct the respective running characteristics may be constant or uniform, resulting, possibly, in a slight discrepancy with the driving preference(s) that differs among individual drivers. In view of this, the control system of the embodiment of the invention may be structured to allow the correction amounts of the respective characteristics described above or the respective characteristics to be finely adjusted through the driver's manual operation. FIG. 12 shows an example system for such manual adjustment. Referring to FIG. 12, an adjustment mechanism 50, which may be, for example, a rotary switch or slide switch, is provided, and the adjustment mechanism 50 is electrically connected to a running characteristics control electronic control unit (SPI-ECU) 51. The driver can adjust correction amounts or characteristics, such as those described above, by operating the adjustment mechanism 50.

Figure 13:
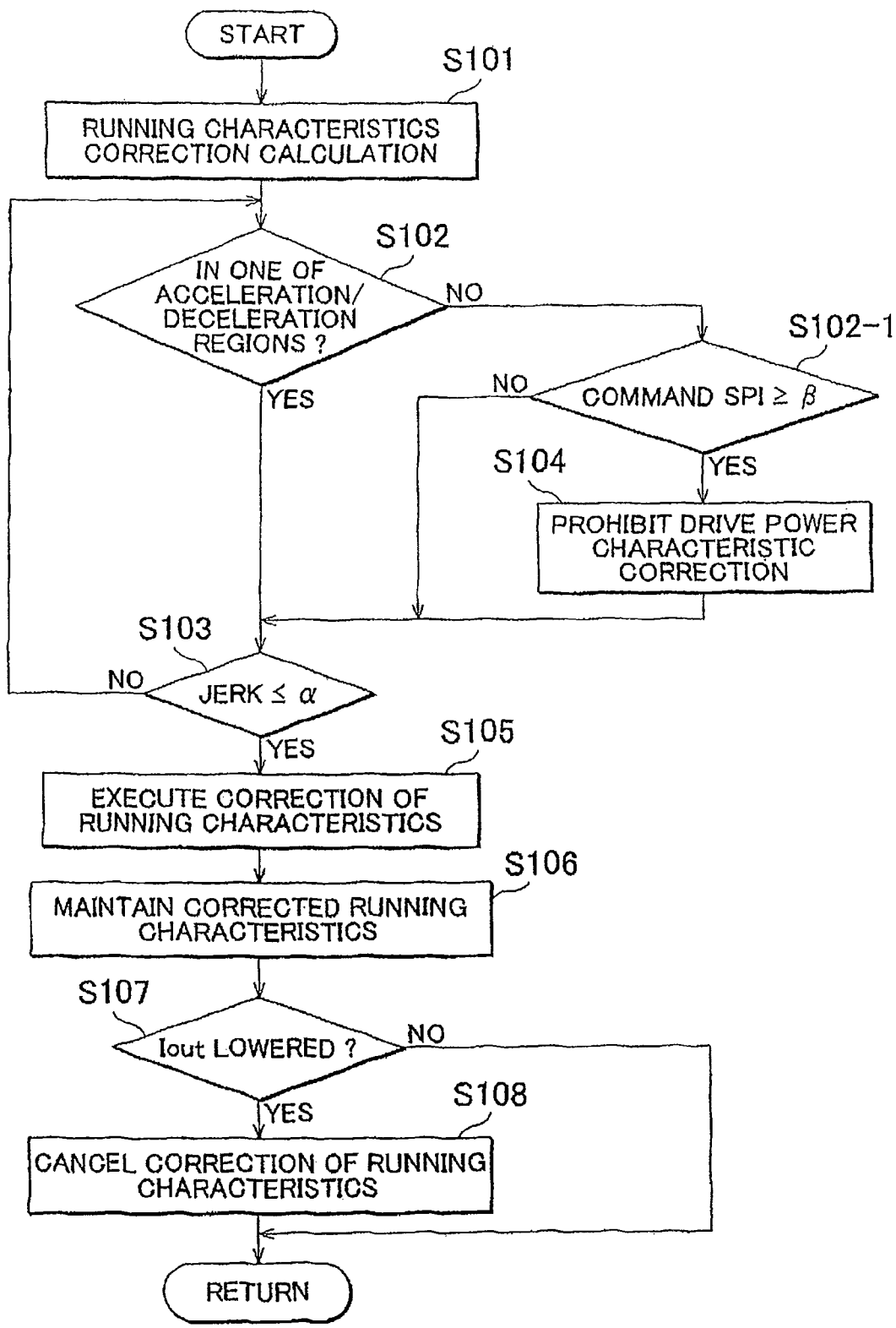
FIG. 13 is a flowchart illustrating an example control routine in which the correction of running characteristics is executed when conditions are satisfied.

As mentioned earlier, the control system of the embodiment of the invention is structured to integrally change or set the running characteristics according to an index indicative of the running condition of the vehicle, such as accelerations, or an index set based on the running condition. Further, this control system may be structured to automatically change the running characteristics when a jerk (i.e., a time derivative of the acceleration or an amount of change in the acceleration per unit time) is less than a predetermined threshold. For more details, an example of such control will be described with reference to the flowchart in FIG. 13. The control routine illustrated in FIG. 13 is repeatedly executed at predetermined short time intervals in a state where specific running characteristics have been developed in accordance with the command SPI Iout set based on the accelerations as described above. Referring to FIG. 13, first, correction amounts for the running characteristics are calculated based on the command SPI Iout (step S101). This correction amounts include amounts of fine adjustments performed by manually operating the mechanisms illustrated in FIGS. 10 to 12.

The above running characteristics to be corrected include, for example, "chassis characteristic" and "drive power characteristic". The chassis characteristic includes, for example, the suspension characteristic developed via the suspension mechanisms and the cornering (turning) characteristic developed via the power-steering system. The drive power characteristic includes, for example, the engine output characteristic and the transmission shift characteristic. The correction amounts calculated in step S101 are used in the process of correcting the predetermined basic characteristics of the respective mechanisms, in accordance with the parameter indicative of the running condition of the vehicle or the parameter set based on the running condition of the vehicle, as the corrections described earlier by way of example.

Subsequently to step S101, it is determined whether a condition for executing the correction is satisfied. More specifically, it is determined whether to execute the correction of running characteristics when the acceleration performance, turning performance, and the like are changed by manual operation while the vehicle is running, that is, whether to execute the correction while the vehicle is running, and therefore, the vehicle is presently being accelerated, decelerated, and/or turned. If the running characteristics are automatically changed while the vehicle behavior is changing in response to the operation performed by the driver, a behavioral change unintended by the driver may be caused, and the driver may feel discomfort. Thus, the correction execution condition described above is defined so as to reduce the feeling of discomfort. In the control routine shown in FIG. 13, it is determined whether the running condition of the vehicle is presently in one of "acceleration/deceleration regions (acceleration/braking regions)" (step S102). More specifically, the acceleration/deceleration regions are regions set in the tire friction circle shown in FIG. 3, where the proportion of the component of the longitudinal acceleration Gx, which is one of the accelerations used in calculating the synthetic acceleration (the instantaneous SPI Iin), is higher than that of the component of the lateral acceleration Gy, which is the other of the accelerations used in calculating the synthetic acceleration (the instantaneous SPI Iin). For example, a region that is defined, in the upper half of the tire friction circle in FIG. 3, between a line inclined leftward by 45 degrees (±5 degrees) with respect to the line Gx and a line inclined rightward by 45 degrees (±5 degrees) with respect to the line Gx is used as one of the acceleration/deceleration regions, that is, as an acceleration region in the acceleration side of the tire friction circle, and a region that is defined in the lower half of the tire friction circle between the same inclined lines is used as the other of the acceleration/deceleration regions, that is, as a braking region in the deceleration side of the tire friction circle. The regions other than the acceleration/deceleration regions described above in the tire friction circle are turning regions. Thus, in the turning regions, the component of the lateral acceleration Gy is larger than the component of the lateral acceleration Gy in the acceleration/deceleration regions.

If the running condition of the vehicle is in one of the acceleration/deceleration regions and therefore the result of the determination in step S102 is positive (YES), it is then determined whether the present jerk (a time derivative of the acceleration or an amount of change in the acceleration per unit time) is equal to or less than a predetermined determination reference value α (step S103). That is, in step S103, it is determined whether the time derivative of the acceleration in the vehicle is stable, and therefore the determination reference value α is a value close to 0. Thus, the determination process in step S103 is the same as the determination process that is generally executed in place of the determination process using "0" as its reference value.

On the other hand, if the result of the determination in step S102 is negative (NO), it is then determined whether the command SPI Iout is large, more specifically, whether the command SPI Iout is equal to or larger than a predetermined reference value β (step S102-1). If the result of the determination in step S102-1 is negative (NO), the control proceeds to step S103. Conversely, if the result of the determination in step S102-1 is positive (YES), execution of the correction of the characteristic(s) related to drive power is prohibited (step S104). If the result of the determination in step S102 is negative, the running condition of the vehicle is in one of the above-described turning regions. If the running characteristics related to the engine output, the speed ratio, and the like are changed to a large extent when the running condition of the vehicle is in one of the turning regions, the driver may feel discomfort. Therefore, in a case where the running characteristics related to the engine output, the speed ratio, and the like will be changed to a large extent if the correction is executed, the execution of the correction of the characteristic(s) related to drive power may be prohibited. That is, in a case where the running characteristics related to the engine output, the speed ratio, and the like will change to a small extent if the correction is executed, the execution of the correction is permitted.

If the result of the determination in step S103 is negative (NO), the control returns to step S102. That is, even when the vehicle is traveling in a generally straight line and therefore the result of the determination in step S102 is positive (YES), if the longitudinal acceleration is changing from moment to moment in response to the operation performed by the driver and therefore the result of the determination in step S103 is negative (NO), changing the characteristic(s) of the vehicle through the running characteristics correction may affect the way in which the behavior of the vehicle changes in response to the operation performed by the driver, and as a result, the driver may feel discomfort. In view of this, if the result of the determination in step S103 is negative (NO), the control returns to step S102, and thus the running characteristics correction is not executed.

Accordingly, if the jerk is equal to or less than the determination reference value α and therefore the determination in step S103 is positive (YES), then the running characteristics correction is executed (step S105). That is, the control in this step is the above-described control for changing, according to the correction amounts calculated in step S101, the respective basic characteristics according to which the drive power of the engine, the speed ratio of the transmission, the characteristic of the suspension mechanisms, and the characteristic of the power steering system are set. As a result, the driver's intention(s) regarding the running is reflected in the running characteristics including the drive power characteristic, shift characteristic, and suspension characteristic. Thus, when the driver is driving the vehicle, the running performance and/or behavior intended or expected by the driver can be obtained, and thus, good driveability can be obtained.

After step S105, the corrected running characteristics are maintained (step S106). The correction of the running characteristics may be cancelled in response to lowering of the command SPI Iout, as shown in FIG. 13 by way of example. In the example shown in FIG. 13, after step S106, it is determined whether the command SPI Iout has lowered (step S107). With regard to lowering of the command SPI Iout, refer to the example illustrated in FIG. 4 and the foregoing descriptions on it. If the result of the determination in step S107 is negative (NO), the present cycle of the control routine ends and the corrected running characteristics continue to be maintained. Conversely, if the result of the determination in step S107 is positive (YES) due to a decrease in the command SPI Iout, the correction of the running characteristics is canceled (step S108), and the present cycle of the control routine ends. That is, the running characteristics are set according to the value of the command SPI Iout. Note that the correction may be reset in response to the main switch in the vehicle being turned off.

In the control system described above as an example of the invention, thus, a single parameter is determined based on the running condition, and the control amounts for a plurality of actuators related to the behavior of the vehicle are integrally determined according to the single parameter, whereby the running characteristics, including the drive power characteristic, and chassis characteristic, are made more conformable to the driver's driving preference(s). In other words, since a plurality of control factors for setting the running characteristics are integrally determined, it is possible to obtain good overall running characteristics. Further, since the respective running characteristics can be integrally corrected or set without operating a plurality of switches individually provided for, for example, adjusting the drive power characteristic, chassis characteristic, and so on, it is possible to reduce the possibility that the driver suffers from, for example, difficulty in operating the plurality of switches to adjust the operation amounts of the respective switches with respect to each other.

The invention claimed is:

1. A vehicle control system comprising:
at least one sensor;
an electronic control unit configured to perform various calculations and computations according to programs using data received from the at least one sensor and pre-stored data, the electronic control unit having a control portion configured to determine a single parameter based on a running condition of a vehicle, and determine control amounts for a plurality of actuators provided in the vehicle based on the parameter, wherein
a relation of the control amount for each of the plurality of actuators to the parameter is predetermined; and
the control portion is configured to, when the parameter is determined, determine the control amounts for the respective actuators based on the parameter, and integrally control the actuators based on the determined control amounts, wherein
the parameter includes a parameter determined based on a synthetic acceleration obtained at each moment by synthesizing an acceleration in a longitudinal direction of the vehicle and an acceleration in a lateral direction of the vehicle, and
the parameter rises immediately in a response to an increase in the synthetic acceleration, and lowers after a difference between the parameter and the synthetic acceleration is greater than a predetermined threshold and for at least a preset amount of time.

2. The vehicle control system according to claim 1, wherein
the parameter includes a parameter determined based on a measured acceleration detected by a sensor provided in the vehicle, or an estimated acceleration calculated from an operation amount of an operating mechanism that causes an acceleration in the vehicle.

3. The vehicle control system according to claim 1, wherein
the plurality of actuators include at least any two of an output control actuator that changes an output from a drive power source of the vehicle, a shift actuator that changes a speed ratio of a transmission provided in the vehicle, an actuator of a steering mechanism provided in the vehicle, a suspension actuator of a suspension mechanism provided in the vehicle, and an effect producing actuator provided in the vehicle.

4. The vehicle control system according to claim 1, wherein
the plurality of actuators include an output control actuator that changes an output from a drive power source of the vehicle, a shift actuator that changes a speed ratio of a transmission provided in the vehicle, an actuator of a steering mechanism provided in the vehicle, and a suspension actuator of a suspension mechanism provided in the vehicle.

5. The vehicle control system according to claim 1, wherein
an operation characteristic of each of the plurality of actuators is predetermined, the operation characteristic being a relation of an operating amount to a command signal; and
the control amount includes a control amount that changes the operation characteristic.

6. The vehicle control system according to claim 1, wherein
the control amount for each of the plurality of actuators changes at least one of a timing at which the actuator is operated, and an operating amount of the actuator.

7. The vehicle control system according to claim 1, further comprising
an adjustment mechanism that is manually operated to change the control amounts determined based on the single parameter.

8. The vehicle control system according to claim 1, further comprising
a switching portion that switches a running mode of the vehicle among an automatic mode, an economy mode, a sport mode, a snow mode, and a normal mode, wherein
the control portion is configured to determine the single parameter, determine the control amounts for the respective actuators based on the parameter, and control the actuators based on the determined control amounts, when the automatic mode is selected using the switching portion.

9. The vehicle control system according to claim 5, wherein
the control portion determines whether the running condition of the vehicle is in one of an acceleration region and a deceleration region set in a tire friction circle;
if the control portion determines that the running condition of the vehicle is in one of the acceleration region and the deceleration region, the control portion determines whether a time derivative of an acceleration or an amount of change in the acceleration per unit time is equal to or less than a predetermined determination reference value; and
if the control portion determines that the time derivative of the acceleration or the amount of change in the acceleration per unit time is equal to or less than the predetermined determination reference value, the control portion changes the operation characteristic of each of the plurality of actuators using the control amount.

* * * * *